(12) United States Patent
Chen et al.

(10) Patent No.: US 10,484,582 B2
(45) Date of Patent: Nov. 19, 2019

(54) CAMERA DEVICE AND MOBILE TERMINAL USING THE SAME

(71) Applicant: GUANGDONG OPPO MOBILE TELECOMMUNICATIONS CORP., LTD., Dongguan, Guangdong (CN)

(72) Inventors: Jia Chen, Dongguan (CN); Maozhao Huang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/183,564

(22) Filed: Nov. 7, 2018

(65) Prior Publication Data

US 2019/0141220 A1 May 9, 2019

(30) Foreign Application Priority Data

Nov. 9, 2017 (CN) .......................... 2017 1 1099410
Nov. 9, 2017 (CN) .......................... 2017 1 1100421
(Continued)

(51) Int. Cl.
*H04N 5/225* (2006.01)
*H04M 1/02* (2006.01)

(52) U.S. Cl.
CPC ........ *H04N 5/2253* (2013.01); *H04M 1/0264* (2013.01); *H04N 5/2257* (2013.01); *H04N 5/2258* (2013.01)

(58) Field of Classification Search
CPC .................................................. H04N 5/2253
(Continued)

(56) References Cited

U.S. PATENT DOCUMENTS

2014/0022450 A1   1/2014  Chang et al.
2014/0186018 A1   7/2014  Lin
(Continued)

FOREIGN PATENT DOCUMENTS

CN          104954515 A       9/2015
CN          105635535 A       6/2016
(Continued)

OTHER PUBLICATIONS

Notification of an Office Action and search report issued in corresponding Chinese application No. 201711099410.6, dated Feb. 1, 2019, and translation.
(Continued)

*Primary Examiner* — Joel Ajayi
(74) *Attorney, Agent, or Firm* — Ladas & Parry, LLP

(57) ABSTRACT

The disclosure relates to a mobile terminal, includes a display screen, a border and a rear housing, the display screen and the rear housing being respectively disposed on two sides of the border, a mounting member being disposed between the display screen and the rear housing. The mobile terminal also includes a camera device connected to the mounting member, and the camera device includes a camera unit and a bracket. The bracket includes a frame body and a fixing portion connected to the frame body, the frame body defines a receiving space, and the camera unit is partially accommodated in the receiving space. The fixing portion is set on a side of the frame body facing away from the receiving space, and the camera device is connected to the mounting member by the fixing portion. The disclosure also relates to the camera device and bracket of the above mobile terminal.

17 Claims, 11 Drawing Sheets

(30) Foreign Application Priority Data

Nov. 9, 2017 (CN) .................. 2017 2 1487264 U
Nov. 9, 2017 (CN) .................. 2017 2 1488134 U

(58) Field of Classification Search

USPC ..................................................... 455/556.1
See application file for complete search history.

(56) References Cited

U.S. PATENT DOCUMENTS

| | | |
|---|---|---|
| 2014/0253799 A1 | 9/2014 | Moon et al. |
| 2015/0288053 A1 | 10/2015 | Saxe |
| 2015/0366110 A1 | 12/2015 | Park et al. |

FOREIGN PATENT DOCUMENTS

| | | |
|---|---|---|
| CN | 106231018 A | 12/2016 |
| CN | 106506734 A | 3/2017 |
| CN | 206004729 U | 3/2017 |
| CN | 106603765 A | 4/2017 |
| CN | 106850882 A | 6/2017 |
| CN | 206294254 U | 6/2017 |
| CN | 107124539 A | 9/2017 |
| CN | 206533441 U | 9/2017 |
| CN | 107749904 A | 3/2018 |
| CN | 107770313 A | 3/2018 |
| CN | 207369098 U | 5/2018 |
| CN | 207410383 U | 5/2018 |
| CN | 207802016 U | 8/2018 |
| CN | 207802018 U | 8/2018 |
| EP | 1750417 A2 | 2/2007 |
| EP | 2555526 A | 2/2013 |
| KR | 101792439 B1 | 10/2017 |

OTHER PUBLICATIONS

Notification of an Office Action issued in corresponding Chinese application No. 201711100421.1, dated Feb. 12, 2019, and translation.

International Search Report and Written Opinion issued in corresponding International application No. 2018114226, dated Jan. 29, 2019 (12 pages).

European Search Report and opinion issued in corresponding European application No. 18205165.6, dated Mar. 8, 2019 (7 pages).

Notification of an Office Action issued in corresponding Chinese application No. 201711099410.6, dated Apr. 28, 2019(4 pages).

International Search Report and written opinion issued in corresponding International application No. 2018114229, dated Jan. 23, 2019 (10 pages).

European Search Report issued in corresponding European application No. 18205316.5, dated Jan. 18, 2019 (9 pages).

CAMERA DEVICE AND MOBILE TERMINAL USING THE SAME

CROSS-REFERENCE TO RELATED APPLICATION

This application claims priority to a Chinese application No. 201711099410.6 filed on Nov. 9, 2017, titled "MOBILE TERMINAL, CAMERA MODULE AND BRACKET THEREOF", a Chinese application No. 201721487264.X filed on Nov. 9, 2017, titled "MOBILE TERMINAL, CAMERA MODULE AND BRACKET THEREOF", a Chinese application No. 201711100421.1 filed on Nov. 9, 2017, titled "MOBILE TERMINAL, CAMERA MODULE AND BRACKET THEREOF", and a Chinese application No. 201721488134.8 filed on Nov. 9, 2017, titled "MOBILE TERMINAL, CAMERA MODULE AND BRACKET THEREOF". The disclosures of the above-mentioned applications are hereby incorporated in their entities by reference.

TECHNICAL FIELD

The present disclosure relates to a technical field of mobile terminals, and particularly to a camera device, a bracket and a mobile terminal using same.

BACKGROUND

With the continuous development of electronic technology, mobile terminals such as smartphones or tablet computers have become commonly used by users. At present, the mobile terminals with cameras are becoming more and more popular. The cameras enable the mobile terminals to take pictures and videos while having a call function, thereby greatly enriching and expanding the use function of the mobile terminal, and adding a lot of fun to people's lives.

SUMMARY

The present disclosure provides a camera device, a bracket, and a mobile terminal using the camera device and the bracket.

The disclosure provides a bracket. The bracket is adapted for fixing a camera unit. The bracket may include a frame body and at least one fixing portion. The frame body may define a receiving space for partially accommodating the camera unit. The at least one fixing portion may be connected to the frame body and set on the at least one side of the frame body facing away from the receiving space. The at least one fixing portion may be configured to connect an external device to connect the camera unit to the external device.

The disclosure also provides a camera device. The camera device may include a camera unit and a bracket. The bracket may include a frame body and the at least one fixing portion. The frame body may define a receiving space, and the camera unit may be partially accommodated in the receiving space. The at least one fixing portion may be connected to the frame body and set on at least one side of the frame body facing away from the receiving space. The at least one fixing portion may be configured to connect an external device to connect the camera unit to the external device.

The disclosure further provides a mobile terminal. The mobile terminal may include a display screen, a border, a rear housing, a mounting member, and a camera device. The display screen and the rear housing may be respectively disposed on two sides of the border. The mounting member may be disposed between the display screen and the rear housing. The camera device may be connected to the mounting member. The camera device may include a camera unit and a bracket. The bracket may include a frame body and the at least one fixing portion. The frame body may define a receiving space, and the camera unit may be partially accommodated in the receiving space. The at least one fixing portion may be connected to the frame body and set on at least one side of the frame body facing away from the receiving space. The camera device may be connected to the mounting member by the at least one fixing portion.

BRIEF DESCRIPTION OF THE DRAWINGS

In order to more clearly illustrate the technical solution of the present disclosure, a brief description of the drawings used in the embodiments will be briefly described below. Obviously, the drawings in the following description are only some of the embodiments of the present disclosure, and those skilled in the art can obtain other drawings according to the drawings without any creative work.

DETAILED DESCRIPTION OF PREFERRED EMBODIMENTS

Figure 1:
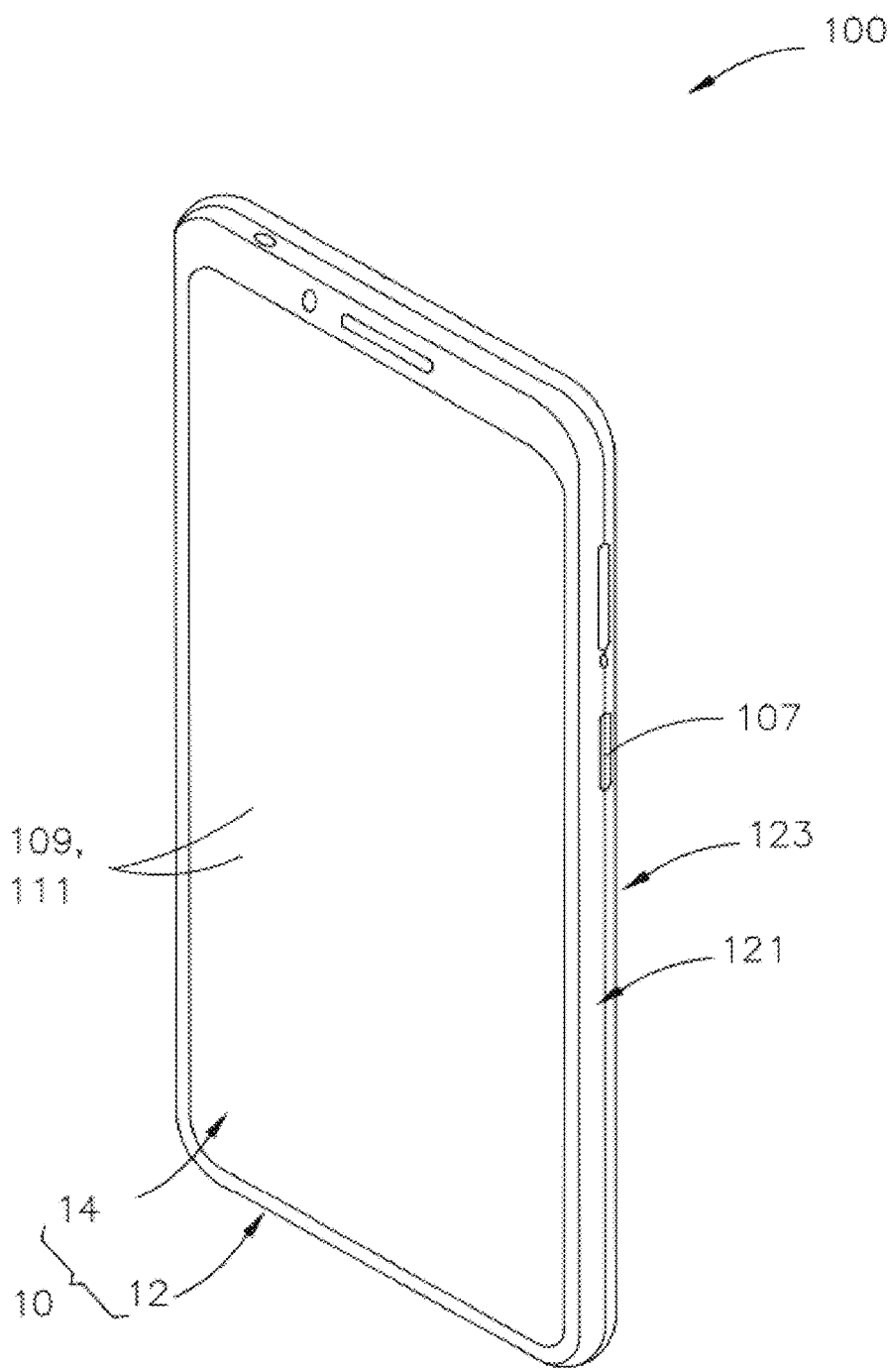
FIG. 1 is a schematic view of the mobile terminal according to an embodiment of the present disclosure.

The technical solutions in the embodiments of the present disclosure will be clearly and completely described in the following with reference to the accompanying drawings in the embodiments. It is apparent that the described embodiments are only a part of the embodiments of the present disclosure, and not all of them. Based on the embodiments in the present disclosure, all other embodiments obtained by those skilled in the art without creative efforts are within the scope of the present disclosure.

The "communication terminal" (or simply "terminal") used in the present disclosure includes, but is not limited to, a device that is configured to connect via a wireline (such as via a public switched telephone network (PSTN), a digital subscriber line (DSL), a digital cable, a direct cable connection, and/or another data connection/network), and/or receive/transmit a communication signal via a wireless interface (e.g., for a cellular network, a wireless local area network (WLAN), a digital television networks such as DVB-H networks, a satellite networks, a AM-FM broadcast transmitters, and/or another communication terminal). Communication terminals that are arranged to communicate over a wireless interface may be referred to as "wireless communication terminals", "wireless terminals", and/or "mobile terminals". Examples of mobile terminals include, but are not limited to, satellite or cellular telephones, personal communication system (PCS) terminals that can combine cellular radiotelephone as well as data processing, faxing, and data communication capabilities, PDAs that may include radiotelephones, pagers, Internet/Intranet access, web browsers, notepads, calendars, and/or global positioning system (GPS) receivers, and conventional laptop and/or palmtop receivers or other electronic devices including radiotelephone transceivers.

The embodiment of the present disclosure provides a bracket, and the bracket is adapted for holding a camera unit. The bracket may include a frame body and at least one fixing portion. The frame body may define a receiving space for accommodating at least part of the camera unit. The at least one fixing portion may be disposed on a side of the frame body away from the receiving space. The at least one fixing portion is configured to connect an external device to connect the camera unit to the external device.

The embodiment of the present disclosure further provides a camera device. Wherein the camera device may include the camera unit and the bracket. The bracket may include the frame body and the at least one fixing portion. The frame body may define a receiving space, and at least part of the camera unit is accommodated in the receiving space. The at least one fixing portion may be disposed on the side of the frame body away from the receiving space. The at least one fixing portion is configured to connect the external device to connect the camera unit to the external device.

The embodiment of the present disclosure further provides a mobile terminal. The mobile terminal may include a display screen, a border, a rear housing, a mounting member and a camera device.

The display screen and the rear housing may be respectively disposed on two sides of the border. The mounting member may be disposed between the display screen and the rear housing. The camera device may be connected to the mounting member. The camera device may include the camera unit and the bracket. The bracket may include the frame body and the at least one fixing portion. The frame body may define a receiving space, and at least part of the camera unit may be accommodated in the receiving space. The at least one fixing portion may be disposed on the side of the frame body that faces away from the receiving space. The camera device is connected to the mounting member by the at least one fixing portion.

In the above mobile terminal, the bracket is configured to hold the camera unit. The frame body of the bracket may be configured for accommodating at least part of the camera unit. The at least one fixing portion of the bracket is configured to connect to the mounting member to enhance the overall structural strength of the camera device. Therefore, in the embodiment of the disclosure, there is no need to provide an additional bottom wall for receiving the camera unit. Thereby reducing the overall thickness of the camera device, the camera device is relatively low in height relative to the rear housing. The camera device can be effectively prevented from being damaged or scratched by external forces, and the integrity and consistency of the appearance of the mobile terminal is improved, which is advantageous for the thin design of the mobile terminal.

In various embodiments of the present disclosure, the type of the mobile terminal is not limited. The more common placement method of the mobile terminal is the reference placement mode, the side facing the user is a "front side", the side facing away from the user is a "back side", a "top" refers to the part near the upper edge of the mobile terminal, and a "bottom" refers to the part near the lower edge of the mobile terminal. The technical solutions in the embodiments of the present disclosure will be clearly and completely described in the following with reference to the accompanying drawings in the embodiments.

Figure 2:
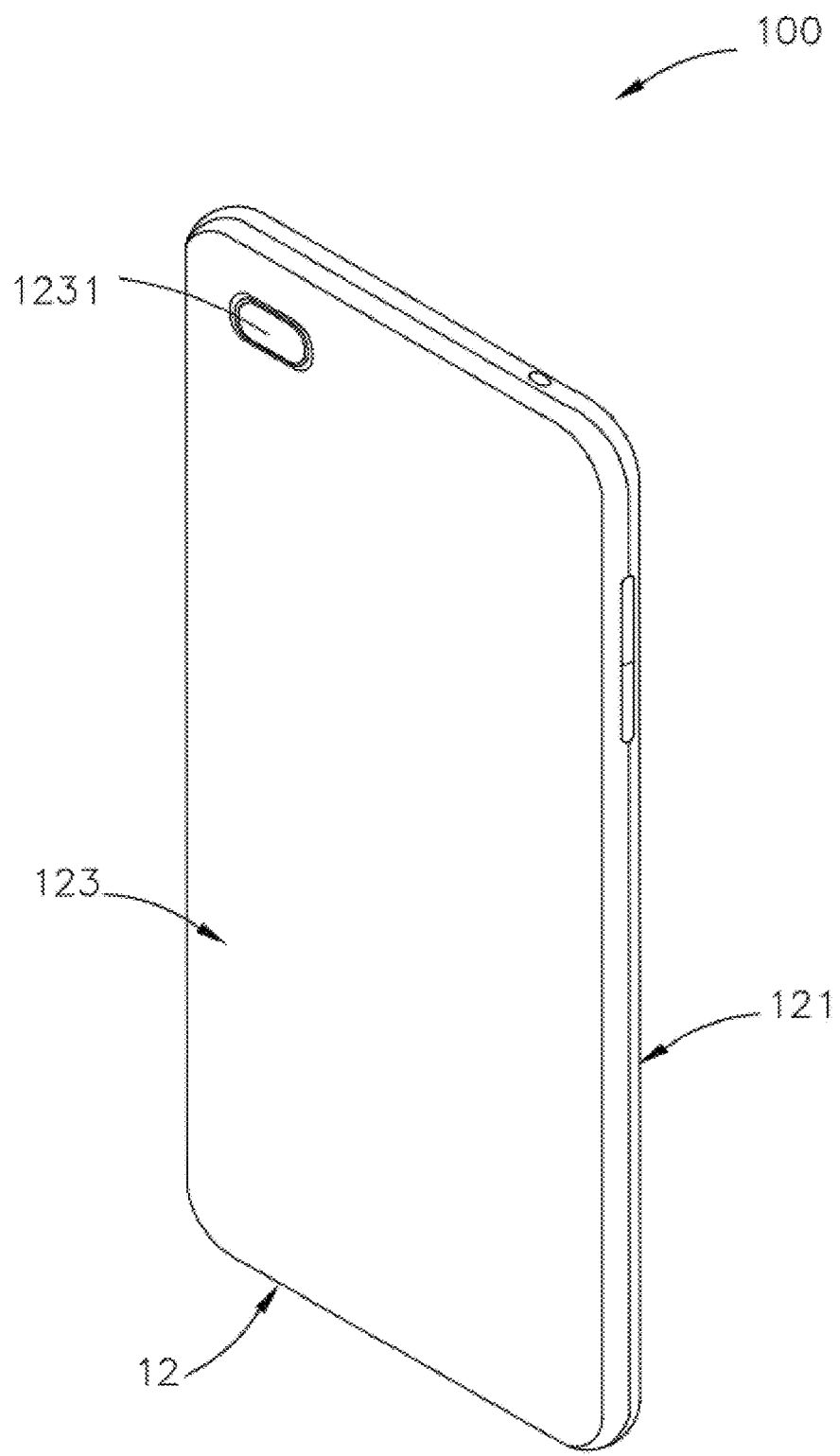
FIG. 2 is a schematic view of another perspective of the mobile terminal illustrated in FIG. 1.
Figure 3:
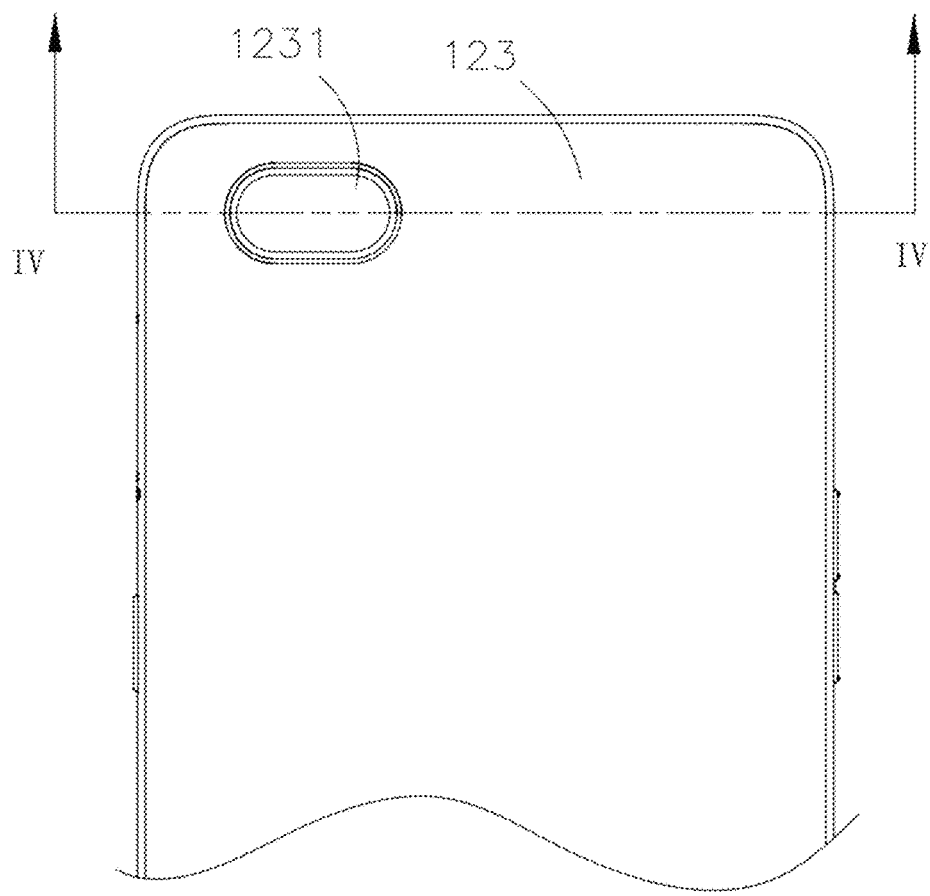
FIG. 3 is a partial schematic view of a rear housing of the mobile terminal illustrated in FIG. 1.

Illustrated in FIG. 1 to FIG. 3, an embodiment of the present disclosure provides a mobile terminal 100. The mobile terminal 100 may be, but not limited to, electronic devices such as mobile phones, tablet computers, or smart watches. In the following description, the mobile terminal 100 of the present embodiment will be described by taking a mobile phone as an example.

FIG. 1 is a schematic view of the mobile terminal according to an embodiment of the present disclosure. The mobile terminal 100 may include a main body 10. The main body 10 may include a housing 12 and a display screen 14 disposed on the housing 12.

The housing 12 may be configured to install the display screen 14 and accommodate the electronic components of the mobile terminal 100. The specific structure of the housing 12 is not limited. In the embodiments illustrated in FIG. 1 and FIG. 2, the housing 12 may include a front housing 121 and a rear housing 123. The display screen 14 may be disposed on one side of the front housing 121. The rear housing 123 is disposed on the side of the display screen 14 opposite to the front housing.

Figure 4:
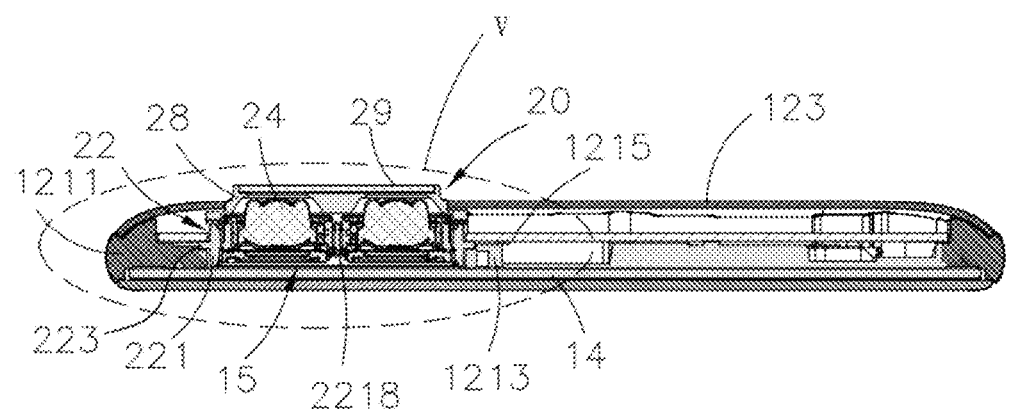
FIG. 4 is a cross-sectional view of the mobile terminal of FIG. 3 taken along line IV-IV.
Figure 5:
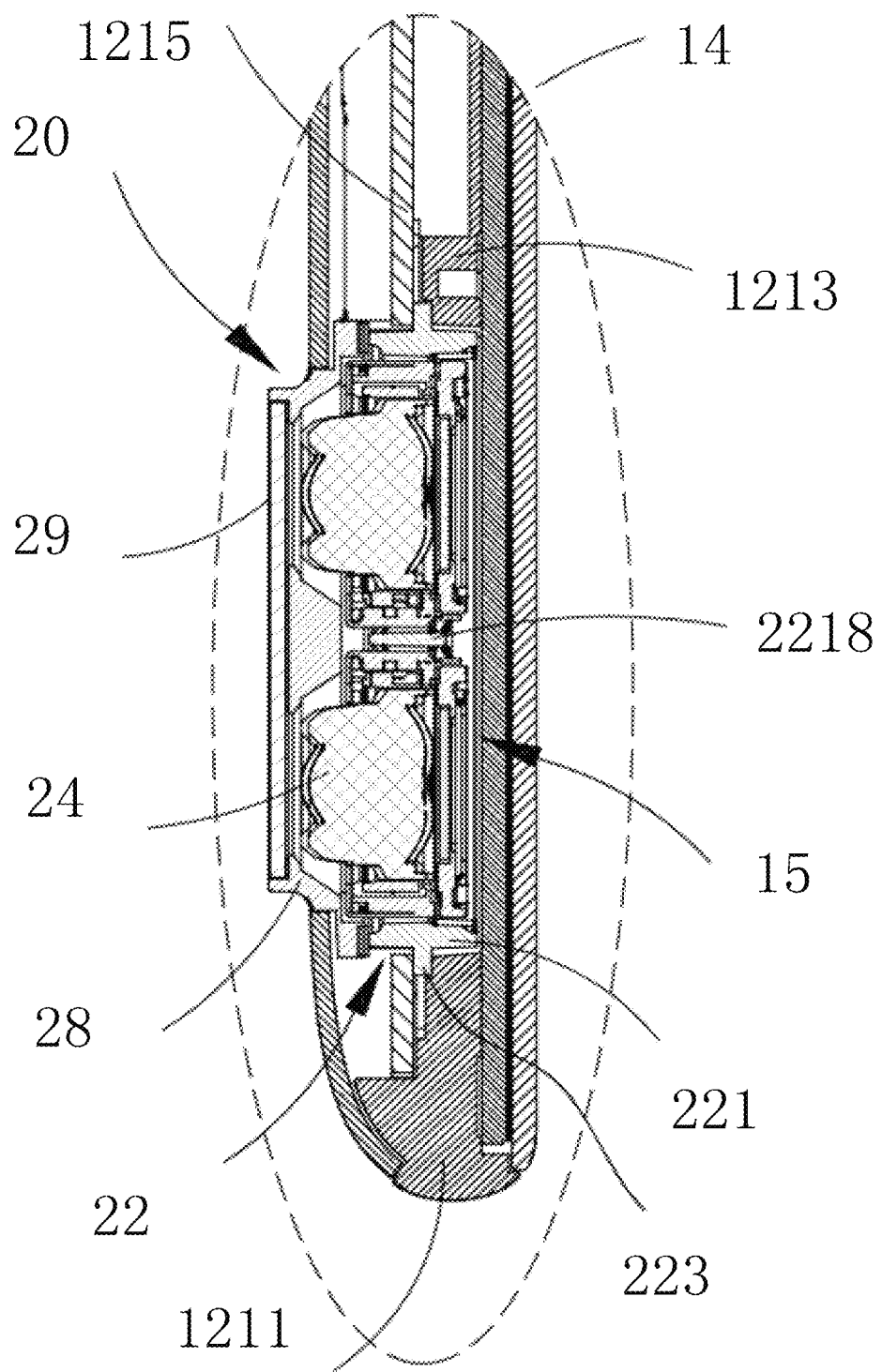
FIG. 5 is an enlarged schematic view of a region V of the mobile terminal illustrated in FIG. 4.
Figure 6:
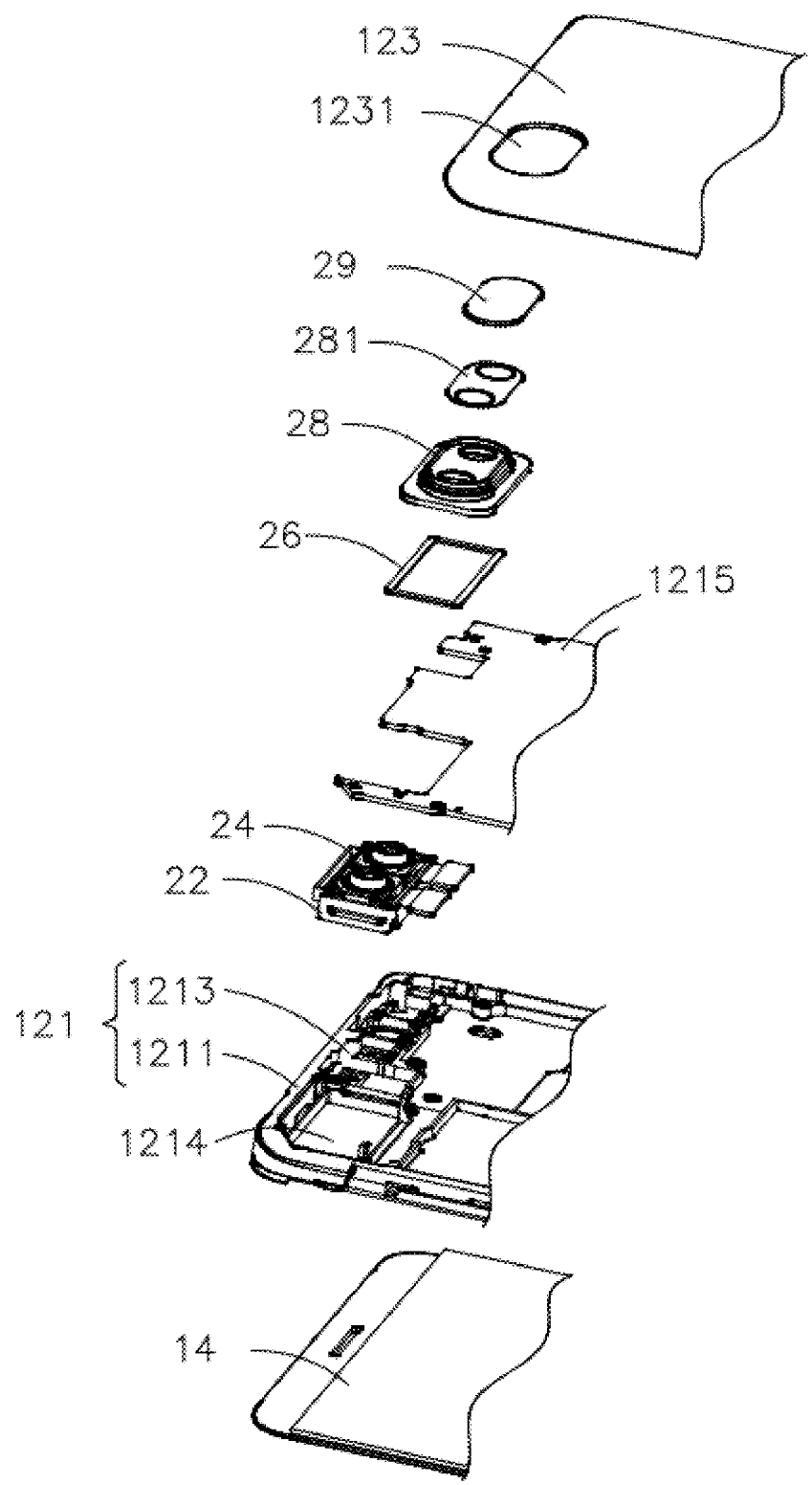
FIG. 6 is a perspective exploded view of the mobile terminal shown in FIG. 1.

Referring to FIG. 4 to FIG. 6 together, the front housing 121 may include a frame 1211 and a mounting member 1213.

In the present embodiment, the frame 1211 is substantially a rounded rectangular frame, and the frame is configured to constitute the border of the mobile terminal 100. It should be understood that the border of the mobile terminal 100 refers to the side portion of the mobile terminal 100 in the thickness direction.

A border, a rear housing and a front surface together form the appearance of a mobile terminal. In the present embodiment, the border, the rear housing 123 and the display screen 14 of the mobile terminal 100 together form the appearance of the mobile terminal 100. The border of the mobile terminal 100 may be integrated with the front surface, may be integrated with the rear housing, or may be a separate border. The specific structural form thereof is not limited herein. In the embodiment illustrated in FIG. 4, the frame 1211 is assembled with the rear housing 123 and the display screen 14.

In this embodiment, the mounting member 1213 is configured to mount the printed circuit board 1215. The printed circuit board 1215 may be a main board of the mobile terminal 100. The mounting member 1213 is embedded in the frame 1211 and therefore the frame 1211 is placed around the mounting member 1213. When the mounting member 1213 is installed in the frame 1211, the mounting member 1213 is disposed between the display screen 14 and the rear housing 123.

As illustrated in FIG. 1, in the embodiment, the display screen 14 generally may include a display panel 111, and may also include a circuit or the like for responding to the touch operation on the display panel 111. The display panel 111 may be a liquid crystal display panel (LCD). In some embodiments, the display panel 111 may be a touch display screen 109 at the same time.

The mobile terminal 100 may further include a camera device 20. The camera device 20 may be disposed in the main body 10. The camera device 20 may be partially exposed to the external environment by a through hole 1231 defined in the rear housing 123 to implement a photographing function.

Figure 7:
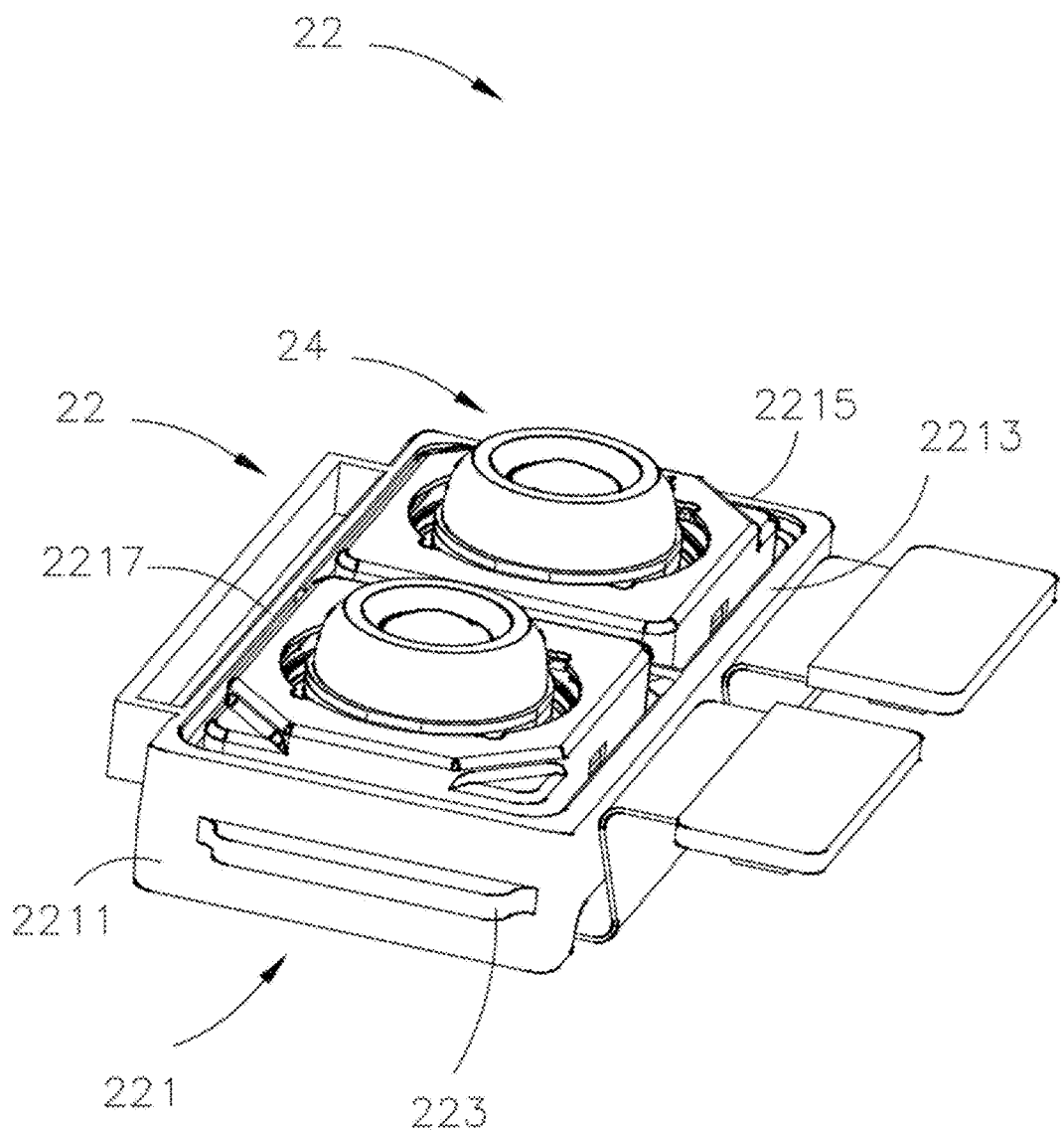
FIG. 7 is a perspective view of the bracket and the camera unit of the mobile terminal illustrated in FIG. 6.

In this embodiment, the camera device 20 may include the bracket 22 and the camera unit 24. The bracket 22 is connected to the mounting member 1213, and the camera unit 24 is connected to the bracket 22. In the embodiment illustrated in FIG. 7, the camera unit 24 may be partially accommodated in the bracket 22, and the bracket 22 may be configured to fix the camera unit 24 on the mounting member 1213.

In some embodiments, the camera unit 24 may include, but is not limited to, a lens assembly, a focus motor, a filter, a sensor, and a housing of the camera and other components. Furthermore, the specific form of the camera unit 24 is not limited. The camera unit 24 can be a single camera unit or a dual camera unit.

The bracket 22 is substantially disposed around the camera unit 24. The bracket 22 is fixedly coupled to the mounting member 1213 by at least one fixing portion of the bracket 22. Since the bracket 22 surrounds the camera unit 24 and the camera unit 24 is connected to the bracket 22, an additional bottom wall for receiving the camera unit 24 can be omitted. Therefore, the overall thickness of the camera device can be reduced and the height of the camera device 20 protruding relative to the rear case 123 can be decreased. Furthermore, the camera device can be effectively prevented from being damaged or scratched by external forces, and the integrity and consistency of the appearance of the mobile terminal is improved, which is advantageous for the thin design of the mobile terminal. In addition, the bracket 22 may be fixedly connected to the mounting member 1213 by the at least one fixing portion of the at least one side surface thereof, so that the camera unit 24 may be mounted on the mounting member 1213. When the mobile terminal 100 is impacted by an external force, the bracket 22 and the at least one fixing portion thereof can transmit the impact external force to the mounting member 1213, thereby protecting the camera unit 24 from external force.

Further, as illustrated in FIG. 6, in order to effectively accommodate the camera device 20, the mounting member 1213 may define a mounting hole 1214 extending through the mounting member 1213. The mounting hole 1214 may be for partially accommodating the camera device 20. When the camera device 20 is mounted in the main body 10, the overall thickness of the mobile terminal 100 is relatively thin. Due to the mounting hole 1214 defined by extending through the bracket 22, and the bracket 22 does not need to provide an additional bottom wall for receiving the camera unit 24, when the camera unit 24 is mounted on the mounting member 1213, a preset gap 15 may be defined between the camera unit 24 and the display screen 24 (illustrated in FIG. 5). When the mobile terminal 100 is impacted by an external force, direct collision between the camera unit 24 and the display screen 14 can be avoided. Thereby, the display screen 14 and the camera unit may be more effectively protected.

The material of the bracket 22 may be not limited. In some embodiments, the bracket 22 may be made of plastic. In other embodiments, the bracket 22 may be made of stainless steel, or the bracket 22 may be made of high alloy steel. Therefore, the bracket 22 has high strength and hardness. The bracket 22 may resist external impact and effectively protect the camera unit 24.

The specific structure of the bracket 22 is not limited. In the embodiment illustrated in FIG. 8, the bracket 22 may be substantially in the form of a hollow frame body. The bracket may include the frame body 221 and the at least one fixing portion 223.

The frame body 221 may be a substantially quadrangular frame shape for accommodating and fixing the camera unit 24. The frame body 221 may include a first side 2211, a second side 2213, a third side 2215, and a fourth side 2217 which are connected end to end. The first side 2211 is substantially parallel to the third side 2215, and the second side 2213 is substantially parallel to the fourth side 2217. The first side 2211, the second side 2213, the third side 2215, and the fourth side 2217 cooperatively define the receiving space 222, and the receiving space 222 is configured to accommodate the camera unit 24.

Further, in some embodiments, when the camera unit 24 is received in the frame body 221, the frame body may be disposed around a periphery of the camera unit, and the end surface of the frame body 221 adjacent to the bottom of the camera unit 24 protrudes relative to the bottom of the camera unit 24. When the camera device 20 is mounted on the mounting member 1213, a preset gap 15 may be defined between the camera unit 24 and the display screen 24. When the mobile terminal 100 is impacted by an external force, direct collision between the camera unit 24 and the display screen 14 can be avoided. Thereby, the display screen 14 and the camera unit may be more effectively protected.

Figure 8:
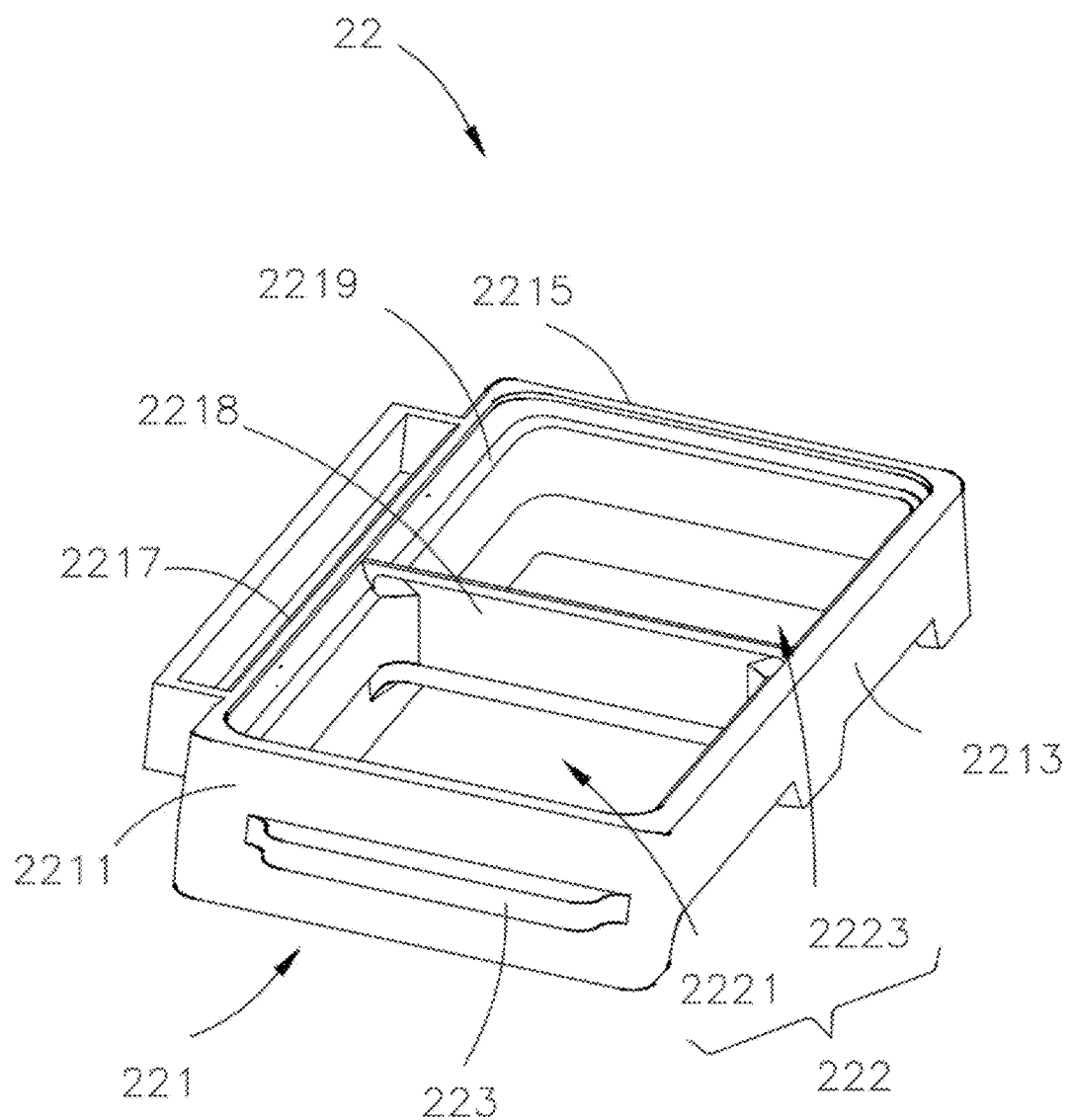
FIG. 8 is a perspective view of the bracket of the mobile terminal illustrated in FIG. 6.

Further, illustrated in FIG. 8, in some embodiments, the bracket 221 may further include a reinforcing partition 2218. The reinforcing partition 2218 may be disposed between the second side 2213 and the fourth side 2217. The two ends of the reinforcing partition 2218 may be respectively connected to the second side 2213 and the fourth side 2217 to increase the structural strength of the frame body 221, thereby preventing the frame body 221 from being deformed when subjected to an external force. The reinforcing partition 2218 is disposed substantially parallel to the first side 2211 and the third side 2215. the receiving space 222 is defined into a first receiving space 2221 and a second receiving space 2223. The reinforcing partition 2218, one portion of the second side 2213 adjacent to the first side 2211, the first side 2211 and one portion of the fourth side 2217 adjacent to the first side 2211 define the first receiving space 2221. The reinforcing partition 2218, the other portion of the second side 2213 adjacent to the third side 2215, the third side 2215 and the other portion of the fourth side 2217 adjacent to the third side 2215 define the second receiving space 2223. Therefore, the frame body 221 can adapt to the camera unit 24 of the dual camera structure, and has strong structural strength at the same time.

In at least one alternative embodiment, the reinforcing partition 2218 may be disposed between the first side 2211 and the third side 2215. The two ends of the reinforcing partition 2218 may be respectively connected to the first side 2211 and the third side 2215. The reinforcing partition 2218 is disposed substantially parallel to the second side 2213 and the fourth side 2217, and the receiving space 222 is defined into a third receiving space and a fourth receiving space 2223. Wherein the reinforcing partition 2218, one portion of the first side 2211 adjacent to the second side 2213, the second side 2213 and one portion of the third side 2215 adjacent to the second side 2213 define the second receiving space. The reinforcing partition 2218, the other portion of the first side 2211 adjacent to the fourth side 2217, the fourth side 2217 and the other portion of the third side 2215 adjacent to the fourth side 2217 define the fourth receiving space. Therefore, the frame body 221 can adapt to the camera unit 24 of the dual camera structure, and the two cameras are respectively disposed in the third receiving space and the fourth receiving space.

Further, illustrated in FIG. 8, in some embodiments, the bracket 22 may further include a reinforcing portion 2219. The reinforcing portion 2219 may be disposed on at least one inner side of the frame body 221, and the reinforcing portion 2219 may protrude from the surface of the at least one inner side of the frame body 221. The reinforcing portion 2219 may be configured for positioning and limiting the camera unit 24, and be configured to strengthen the structural strength of the frame body 221.

In some specific embodiments, the reinforcing portion 2219 may be disposed on a side of the first side 2211, the second side 2213, the third side 2215, and the fourth side 2217 toward the receiving space 222. In at least one alternative embodiment, the reinforcing portion 2219 may also be disposed any one or more of the first side 2211, the second side 2213, the third side 2215, and the fourth side 2217.

Illustrated in FIG. 8, the at least one fixing portion 223 may be disposed outside the frame body 221 and protrudes with respect to the surface of the frame body 221. The at least one fixing portion 223 may be configured to connect with the mounting member 1213.

Specifically, in some embodiments, the at least one fixing portion 223 may be disposed on a side of the frame body 221 that faces away from the receiving space 222 and extends away from the receiving space 222. The at least one fixing portion 223 may be integrally formed with the frame body 221, or the at least one fixing portion 223 may be assembled with the frame body 221.

Specifically, in the embodiment illustrated in FIG. 8, the bracket 22 may include two fixing portions 223, one of the two fixing portions 223 may be coupled to the first side 2211, and the other of the two fixing portions 223 may be coupled to the third side 2215.

It can be understood that in some other embodiments, the number of the fixing portion 223 may be multiple, for example, the fixing portion 223 may be three, four, five, and the like. It can also be understood that the fixing portion 223 can be disposed on any one or more of the first side 2111, the second side 2213, the third side 2215, and the fourth side 2217 of the frame body 221, and be not limited to the description of the embodiments of the present disclosure.

The connection between the at least one fixing portion 223 and the mounting member 1213 is not limited. In some embodiments, the at least one fixing portion 223 and the mounting member 1213 may be bonded by glue, for example, by dispensing bonding, or by double-sided adhesive bonding.

Figure 9:
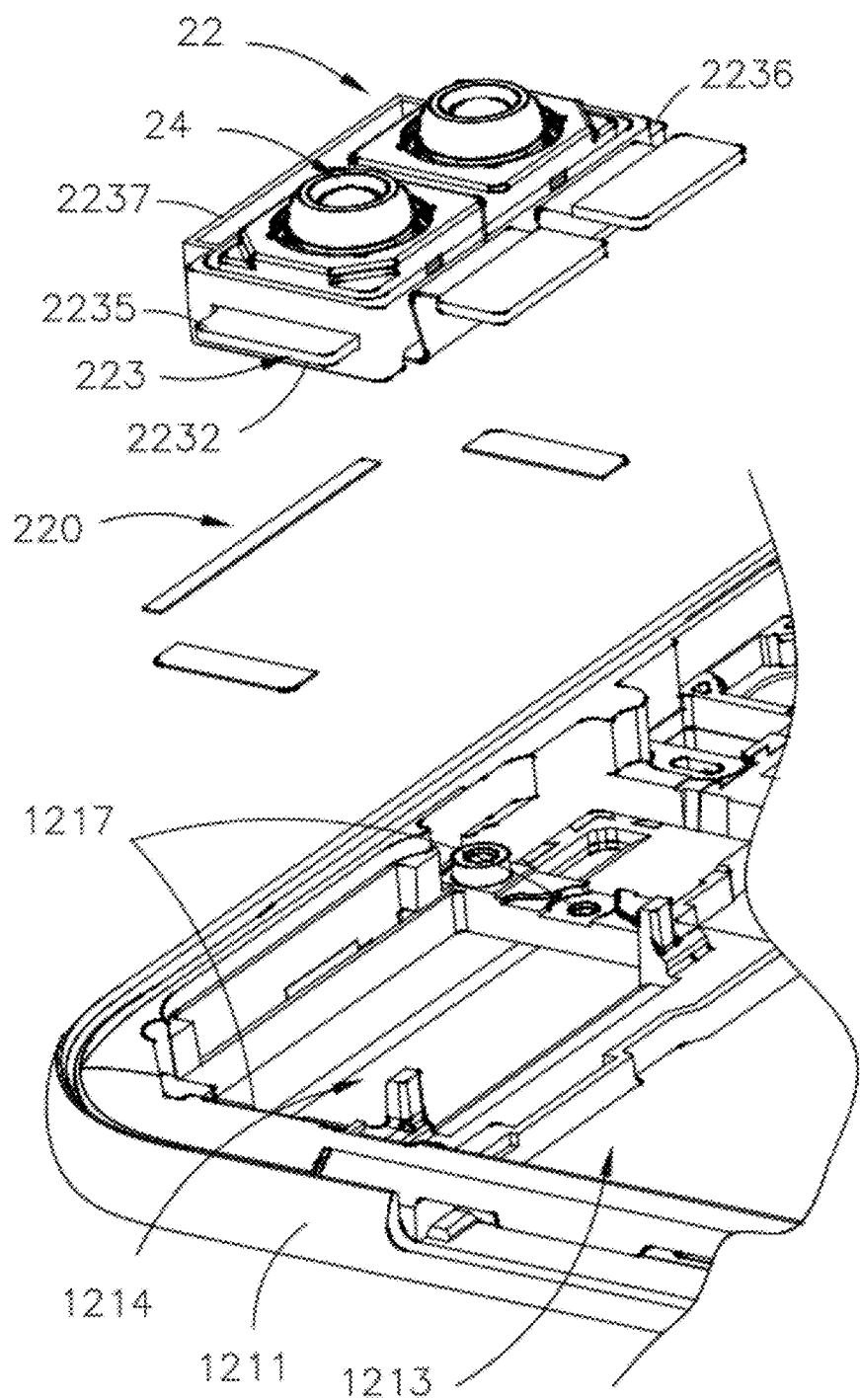
FIG. 9 is a perspective exploded view of the bracket, the camera unit, and the front housing of the mobile terminal according to another embodiment of the present disclosure.

Referring to FIG. 9, in some embodiments, the fixing portion 223 and the mounting member 1213 may be connected by an adhesive 220. Further, a side of the fixing portion 223 facing the mounting member 1213 may be provided with a glue position 2232, and the adhesive 220 may be disposed between the glue position 2232 and the mounting member 1213 to realize the connection between the bracket 22 and the mounting member 1213. The adhesive 220 can be, but not limited to, a double-sided adhesive, a removable adhesive, a low-temperature curing adhesive, and the like. Further, in order to enhance the gripping ability of the glue position 2232, the glue position 2232 may include a gripping surface that is adapted to the type of the adhesive 220. For example, when the adhesive 220 is a double-sided adhesive, the glue position 2232 may include a smooth gripping surface to increase the adhesion of the adhesive 220. For another example, when the adhesive 220 is a low temperature curing adhesive, the glue position 2232 may include a rough gripping surface to increase the adhesion of the adhesive 220.

Further, in the embodiment illustrated in FIG. 9, the number of fixing portion 223 is three, including a first fixing portion 2235, a second fixing portion 2236, and a third fixing portion 2237. The first fixing portion 2235 may be coupled to the first side 2211, the second fixing portion 2236 may be coupled to the third side 2215, and the third fixing portion 2237 may be coupled to the fourth side 2217. The first fixing portion 2235, the second fixing portion 2236, and the third fixing portion 2237 may be generally arranged in a shape of a pattern "", and the first fixing portion 2235, the second fixing portion 2236, and the third fixing portion 2237 may be all connected to the mounting member 1213 through the adhesive 220, so that when the bracket 22 is connected to the mounting member 1213, the adhesive force is uniform. Therefore, the structure of the camera device 20 connected to the housing 12 is firm and reliable.

Figure 10:
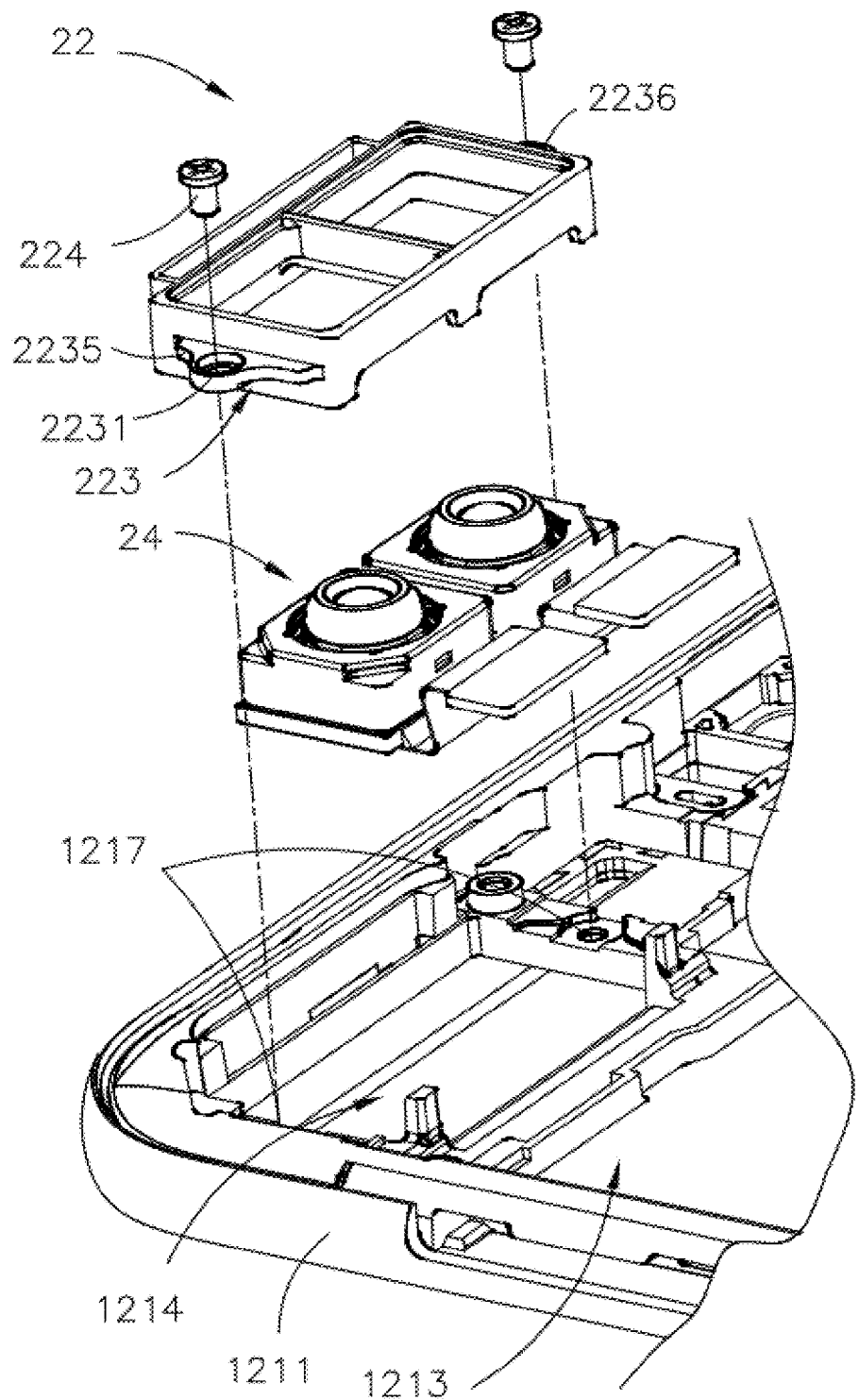
FIG. 10 is a perspective exploded view of the bracket, the camera unit, and the front housing of the mobile terminal according to an additional embodiment of the present disclosure.

Illustrated in FIG. 10, in some embodiments, the at least one fixing portion 223 and the mounting member 1213 maybe connected by a threaded connection. Specifically, in the embodiment illustrated in FIG. 10, the at least one fixing portion 223 may be substantially in the shape of a protruding lug, and each fixing portion 223 may define a connecting hole 2231. Correspondingly, the mounting member 1213 may define at least one screw hole 1217, and the number of screw hole 1217 is equal to the number of the connecting hole 2231. Each fixing portion 223 may be connected to a mounting member 1213 through the screw connection 224 correspondingly, so that the connection between the bracket 22 and the mounting member 1213 is more firm and reliable, and the displacement of the camera device 20 when the mobile terminal 100 is hit by an external force is avoided.

It can be understood that the number of the connecting holes 2231, the screw holes 1217, and the screw connection 224 may be one or more, such as one, two, three, four, or even more. It will be appreciated that the screw connection 224 can be, but is not limited to, a screw, a stud, a bolt, or the like.

Further, in the present embodiment, the number of fixing portions 223 is two, which may include a first fixing portion 2235 and a second fixing portion 2236, and the first fixing portion 2235 may be coupled to the first side 2211 and the second fixing portion 2236 may be coupled to the third side 2215. The first fixing portion 2235 and the second fixing portion 2236 are disposed substantially symmetrically on both sides of the frame body 221, so that the fastening force received when the bracket 22 is attached to the mounting member 1213 is uniform, therefore, the structure of the camera device 20 connected to the housing 12 is firm and reliable.

By connecting the bracket 22 and the mounting member 1213 together by the screw connection 224, the problem of the positioning deviation of the glue bond can be avoided, and the mounting of the camera device 20 may be more accurate. At the same time, the connection strength of the threaded connection is relatively high, when the mobile terminal 100 is impacted by an external force, the bracket 22 and its fixing portion 223 can transmit the impact external force to the mounting member 1213, thereby protecting the camera unit 24 from external force. Since the threaded connection can enhance the structural strength between the bracket 22 and the mounting member 1213, the camera device 20 may be less likely to be displaced during the impact, and the camera device 20 may be more securely mounted.

Referring to FIG. 1, in some embodiments, the fixing portion 223 and the mounting member 1213 may be connected by heat fusion. Specifically, in the embodiment shown in FIG. 11, each fixing portion 223 may be provided with a joint portion 2233, the joint portion 2233 may be configured to connect with the mounting member by hot melt. Correspondingly, the mounting member 1213 may be provided with at least one connecting portion 1218, and each connecting portion 1218 may be connected to one fixing portion correspondingly.

By welding the connecting portion 1218 and the joint portion 2233 together, the connection between the fixing portion 223 and the mounting member 1213 may be realized. The joint portion 2233 may include a structure capable of grasping the hot melt. For example, the joint portion 2233 may include, but is not limited to, at least one of a hole structure, a groove structure, a sawtooth structure, and a stud structure. When the bracket 22 is mounted on the mounting member 1213, each connecting portion 1218 may protrude into the joint portion 2233, and the connecting portion 1218 may be connected to the fixing portion 223 after hot melt.

Figure 11:
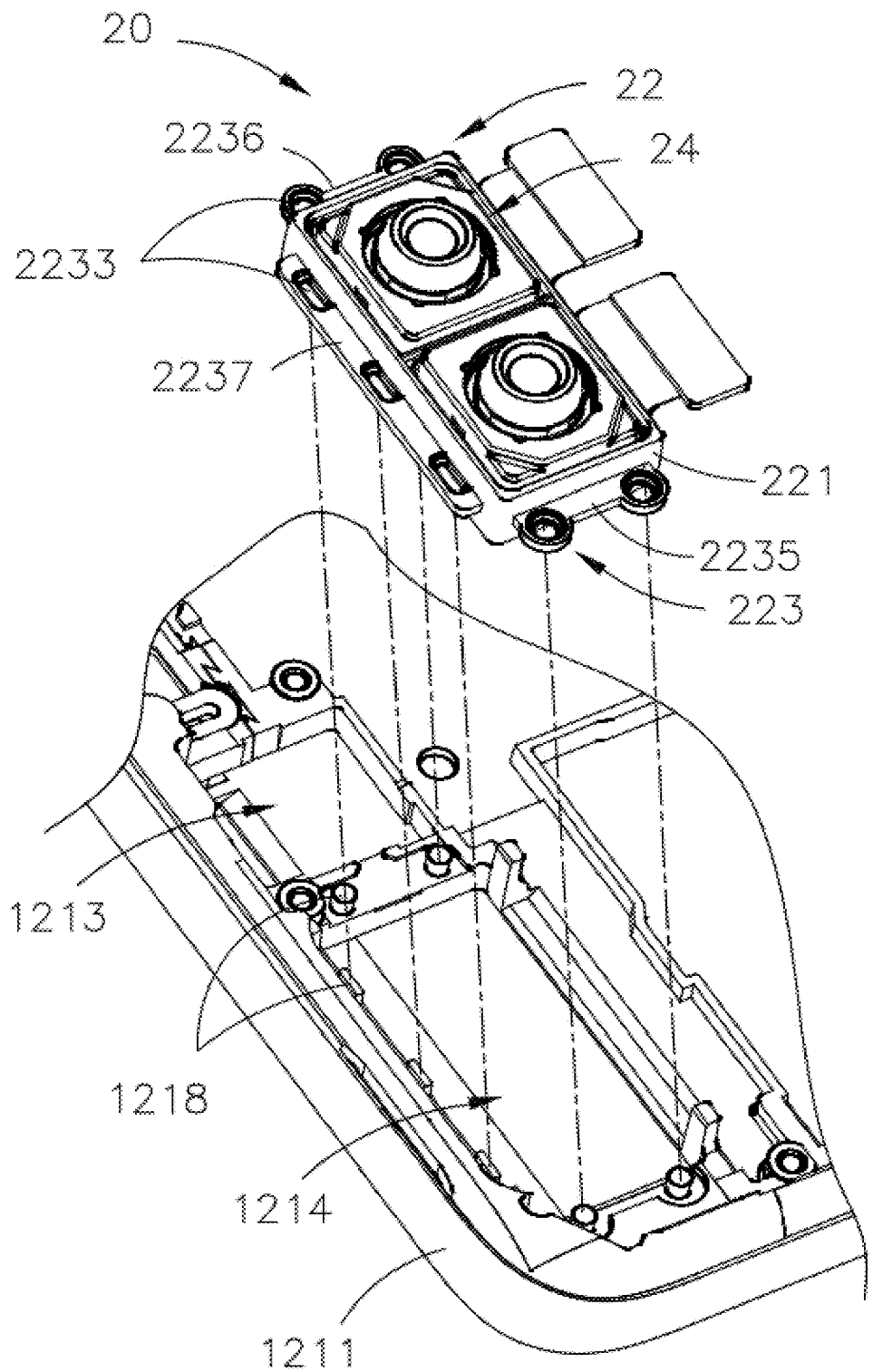
FIG. 11 is a perspective exploded view of the bracket, the camera unit, and the front housing of the mobile terminal according to a further another embodiment of the present disclosure.

For example, in the embodiment illustrated in FIG. 11, the bracket 22 may include three fixing portions 223, and the three fixing portions 223 are respectively disposed on the first side 2211, the third side 2215, and the fourth side 2217, respectively. Each fixing portion 223 may define a connecting hole 2233, that is, the joint portion may be a connecting hole. The mounting member 1213 may be provided with at least one connecting portion 1218, and each connecting portion 1218 may be a hot-melting stud.

Further, in the embodiment illustrated in FIG. 11, the three fixing portions may include a first fixing portion 2235, a second fixing portion 2236, and a third fixing portion 2237. The first fixing portion 2235 may be coupled to the first side 2211, the second fixing portion 2236 may be coupled to the third side 2215, and the third fixing portion 2237 may be coupled to the fourth side 2217. The first fixing portion 2235, the second fixing portion 2236, and the third fixing portion 2237 are generally arranged in a shape of a pattern "品", and the first fixing portion 2235, the second fixing portion 2236, and the third fixing portion 2237 may be all connected to the mounting member 1213 by means of a hot melt connection, so that when the bracket 22 is connected to the mounting member 1213, the fastening force is uniform, so that the structure of the camera device 20 connected to the housing 12 is firm and reliable.

By connecting the bracket 22 and the mounting member 1213 together by the hot melt, the problem of the positioning deviation of the glue bond can be avoided, and the mounting of the camera device 20 is more accurate. At the same time, the connection strength of the hot melt may be relatively high, when the mobile terminal 100 is impacted by an external force, the bracket 22 and its fixing portion 223 can transmit the impact external force to the mounting member 1213, thereby protecting the camera unit 24 from external force. Since the hot melt can enhance the structural strength between the bracket 22 and the mounting member 1213, the camera device 20 may be less likely to be displaced during the impact, and the camera device 20 may be more securely mounted.

Referring again to FIG. 6, the camera device 20 may further include a seal 26, a trim member 28, and a protector 29.

The trim member 28 may be disposed and covered on the side of the camera unit 24 facing away from the mounting member 1213, and the trim member 28 may be configured to cover the internal components of the camera unit 24.

The seal 26 may be disposed between the trim member 28 and the bracket 22. The seal 26 may be configured to form a sealed connection between the trim member 28 and the bracket 22 to prevent liquid, dust and the like from entering the bracket 22 to contaminate the camera unit 24.

In some embodiments, the seal 26 can be made of an elastic material, for example, the seal 26 can be made of any one of materials such as silicone, rubber, foam, and the like. In some specific embodiments, the seal 26 can be a silicone seal, a rubber seal, a foam seal, or the like.

The protector 29 may be disposed and covered on the side of the trim member 28 that faces away from the camera unit 24. In this embodiment, the protector 29 may be a protective lens, which serves as the appearance of the camera device 20 for protecting the internal components of the camera device 20 from external pollutants. The connection between the protector 29 and the trim member 28 is not limited, for example, the protector 29 and the trim member 28 may be bonded by a double-sided adhesive 281 or by dispensing bond.

When the mobile terminal 100 of the embodiment is assembled, the display screen 14 may be mounted on the front housing 121, and the camera unit 24 may be mounted on the bracket 22. Wherein the camera unit 24 and the bracket 22 can be glued together by dispensing.

The bracket 22 may be mounted on the mounting member 1213. The bracket 22 may be partially received in the mounting hole 1214, and a preset gap 15 may be defined between the camera unit 24 and the display screen 14.

The printed circuit board 1215 may be placed in the frame 1211, and the printed circuit board 1215 may be pressed against the fixing portion 223 of the bracket 22. The camera unit 24 may be connected to the printed circuit board 1215 through a board to board (BTB).

The trim member 28 may be installed in the through hole 1231 defined by the rear housing 123, and the seal 26 may be bonded to the trim member 28. The rear housing 123 may be disposed and covered on the front housing 121. The mounting member 28 may be placed on the camera unit 24 and the bracket 22. Wherein the connection between the trim member 28 and the rear housing 123 can be performed by means of dispensing, snap connection, or the like.

The protector 29 may be disposed and covered on the side of the trim member 28 away from the camera unit 24.

In the mobile terminal 100 provided in the embodiment of the present disclosure, the bracket 22 may be configured to fix the camera unit 24. The frame body of the bracket 22 may be configured for partially accommodating the camera unit, and the at least one fixing portion 223 of the bracket 22 may be configured to connect to the mounting member 1213 to enhance the overall structural strength of the camera device 22. There is no need to provide an additional bottom wall for receiving the camera unit 24. Therefore, the overall thickness of the camera device 20 may be reduced. The camera device may be relatively low in height relative to the rear housing 123, the camera device 20 can be effectively prevented from being damaged or scratched by external forces, and the integrity and consistency of the appearance of the mobile terminal 100 is improved, which is advantageous for the thin design of the mobile terminal 100.

Figure 12:
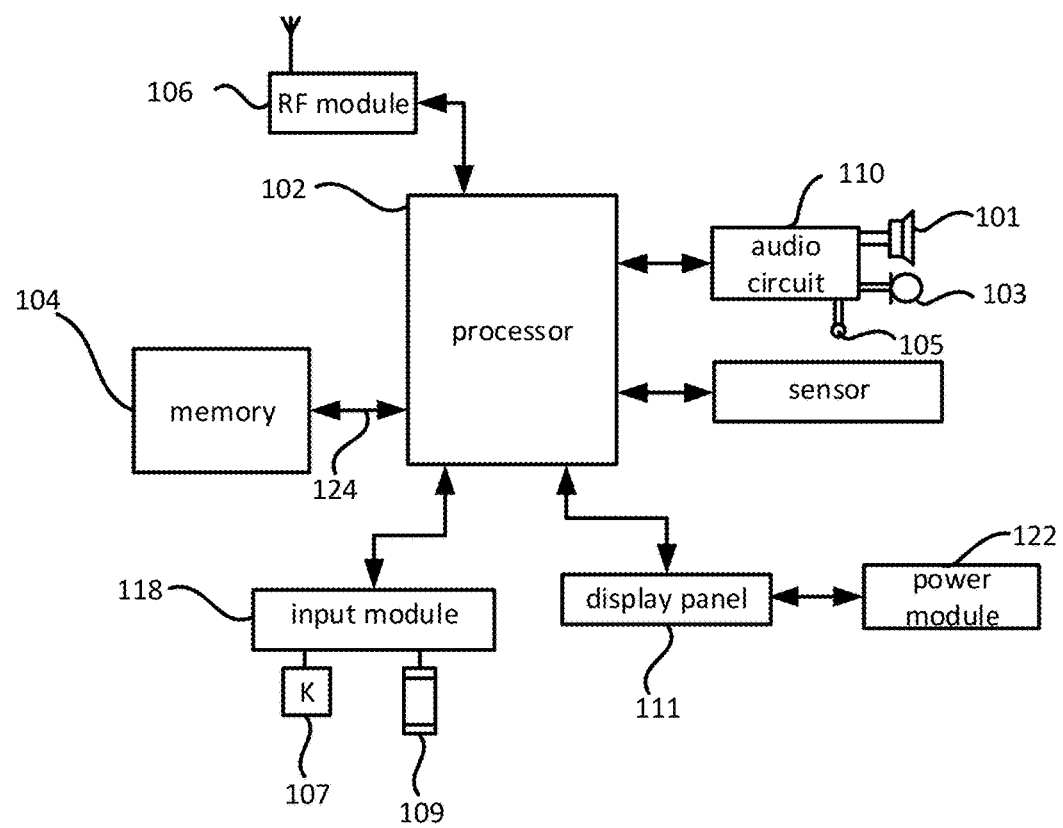
FIG. 12 is a schematic view of a hardware environment of the mobile terminal provided by an embodiment of the present disclosure.

Referring to FIG. 12, with regard to the mobile terminal 100 provided by the embodiment of the present disclosure, in a practical disclosure scenario, the mobile terminal 100 can be used as a smart mobile terminal, such as a smartphone terminal. In this case, the main body 10 usually further includes one or more (only one shown in the figure) processor 102, memory 104, RF (radio frequency) module 106, audio circuit 110, sensor, input module 118, and power module 122. It will be understood by those of ordinary skill in the art that the structure shown in FIG. 12 is merely illustrative and does not limit the structure of the main body 10. For example, the main body 10 may also include more or less components than those illustrated in FIG. 12, or have a different configuration than that illustrated in FIG. 12.

One of ordinary skill in the art will appreciate that all other components are peripherals relative to processor 102, and processor 102 is coupled to the peripherals via a plurality of peripheral interfaces 124. The peripheral interface 124 can be implemented based on the following standards: universal asynchronous receiver/transmitter (UART), general purpose input output (GPIO), serial peripheral interface (SPI), inter-integrated Circuit (I2C), but not limited to the above standards. In some examples, peripheral interface 124 may only include a bus, and in other examples, peripheral interface 124 may also include other components, such as one or more controllers, such as a display controller for connecting the display panel 111 or a memory controller for connecting to the memory. In addition, these controllers can also be detached from the peripheral interface 124 and integrated into the processor 102 or within a corresponding peripheral.

The memory 104 can be configured to store software programs and modules, and the processor 102 executes various functional disclosures and data processing by running software programs and modules stored in the memory 104. Memory 104 may include high speed random access memory and may also include non-volatile memory such as one or more magnetic storage devices, flash memory, or other non-volatile solid state memory. In some embodiments, memory 104 may further include memory remotely configured relative to processor 102, which may be connected to main body 10 or display screen 14 via a network. embodiments of such networks include, but are not limited to, the Internet, intranets, local area networks, mobile communication networks, and combinations thereof.

The RF module 106 is configured to receive and transmit electromagnetic waves, and convert electromagnetic waves and electrical signals to communicate with a communication network or other device. The RF module 106 can include various existing circuit components for performing these functions, such as an antenna, a radio frequency transceiver, a digital signal processor, an encryption/decryption chip, a subscriber identity module (SIM) card, a memory, and the like. The RF module 106 can communicate with various networks such as the Internet, an intranet, a wireless network, or communicate with other devices over a wireless network. The wireless network described above may include a cellular telephone network, a wireless local area network, or a metropolitan area network. The above wireless network can use various communication standards, protocols and technologies, including but not limited to global system for mobile communication (GSM), enhanced data GSM environment (EDGE), wideband code division multiple access (W-CDMA), code division access (CDMA), time division multiple access (TDMA), wireless fidelity (Wi-Fi) (such as the institute of electrical and electronics engineers standards IEEE 802.10A, IEEE 802.11b, IEEE 802.11g and/or IEEE 802.11n), voice over internet protocol (VoIP), worldwide interoperability for microwave access, (Wi-Max), other protocols for mail, instant messaging and short messages, and any other suitable communication protocols, even those that are not currently being developed.

The audio circuit 110, the speaker 101, the sound jack 103, and the microphone 105 together provide an audio interface between the user and the main body 10 or the display screen 14. Specifically, the audio circuit 110 receives sound data from the processor 102, converts the sound data into an electrical signal, and transmits the electrical signal to the speaker 101. The speaker 101 converts the electrical signal into a sound wave that can be heard by the human ear. The audio circuit 110 also receives electrical signals from the microphone 105, converts the electrical signals into sound data, and transmits the sound data to the processor 102 for further processing. Audio data may be obtained from memory 104 or through RF module 106. Additionally, audio data may also be stored in memory 104 or transmitted by RF module 106.

The sensors are disposed within the main body 10 or within the display screen 14, examples of which include, but are not limited to, light sensors, operational sensors, pressure sensors, gravity acceleration sensors, and other sensors. As a type of motion sensor, a gravity acceleration sensor can detect the magnitude of acceleration in each direction (typically three axes), the magnitude and direction of gravity can be detected at rest, and can be configured to identify the disclosure of the mobile terminal 100 (such as horizontal and vertical screen switching, related games, magnetometer attitude calibration), vibration recognition related functions (such as pedometer, tapping) and the like. In addition, the main body 10 can also be equipped with other sensors such as gyroscopes, barometers, hygrometers, thermometers, etc., and will not repeat them here.

In this embodiment, the input module 118 may include a touch display screen 109 disposed on the display screen 14, and the touch display screen 109 may collect the user's touch operation thereon or near (for example, the user operates on the touch display screen 109 or near the touch display screen 109 using any suitable object or accessory such as a finger or a stylus), and drive the corresponding connecting device according to a preset program. Alternatively, the touch display screen 109 may include a touch detection device and a touch controller. Wherein, the touch detection device detects the touch orientation of the user, detects a signal brought by the touch operation, and transmits the signal to the touch controller, the touch controller receives touch information from the touch detection device, converts the touch information into contact coordinates, sends it to the processor 102, and can receive and execute commands from the processor 102. In addition, the touch detection function of the touch display screen 109 can be realized by various types such as resistive, capacitive, infrared, and surface acoustic waves. In addition to touch display screen 109, in other variant embodiments, input module 118 may also include other input devices, such as button 107. The button 107 may include, for example, a character button for inputting a character, and a control button for triggering a control function. Examples of control buttons include a "return to home screen" button, a power on/off button, and the like.

The display screen 14 is used to display information input by the user, information provided to the user, and various graphical user interfaces of the main body 10, and these graphical user interfaces may be composed of graphics, text, icons, numbers, videos, and any combination thereof. In one example, the touch display screen 109 can be disposed on the display panel 111 to form an integral with the display panel 111.

The power module 122 is used to provide power to the processor 102 and other components. Specifically, the power module 122 may include a power management system, one or more power sources (such as a battery or an alternating current), a charging circuit, a power failure detecting circuit, an inverter, a power status indicator, and any other components related to the generation, management, and distribution of power within the main body 10 or the display screen 14.

The mobile terminal 100 also includes a locator 119 for determining the actual location at which the mobile terminal 100 is located. In this embodiment, the locator 119 uses a positioning service to implement positioning of the mobile terminal 100, and the location service should be understood as a technique or service for obtaining the location information of the mobile terminal 100 through a specific positioning technology and marking the location of the located object on the electronic map.

Further, referring again to FIG. 1, in some embodiments, the mobile terminal 100 may be a full-screen mobile terminal, and a full-screen mobile terminal should be understood as a mobile terminal with a Screen-to-body ratio greater than or equal to a preset value, that is, when the display screen 14 is disposed on the front of the housing 12, the percentage of the surface area of the display screen 14 and the projected area of the front of the housing 12 is greater than or equal to the preset. value. In some embodiments, the preset value of the screen ratio may be greater than or equal to 74%, such as 74%, 75%, 76%, 78%, 79%, 80%, 81%, 83%, 85%, 87%, 89%, 90%, 91%, 93%, 95%, 97%, 99%, etc. In some embodiments, the front side of the full-screen mobile terminal can be provided with three or fewer physical keys, and/or the front side of the full-screen mobile terminal can also define with two or fewer openings to simplify the structure of the full-screen mobile terminal, and it is beneficial to increase the screen-to-body ratio of the full-screen mobile terminal.

In the description of the present disclosure, the description with reference to the terms "one embodiment", "some embodiments", "example", "specific example", or "some examples" and the like means that the specific features, structures, materials or characteristics described in connection with the embodiments or examples are included in at least one embodiment or example of the present disclosure. In the present disclosure, the schematic representation of the above terms is not necessarily directed to the same embodiment or example. Furthermore, the particular features, structures, materials, or characteristics described may be combined in a suitable manner in any one or more embodiments or examples. In addition, those skilled in the art can combine the different embodiments or examples described in the specification and the features of the different embodiments or examples without contradicting each other.

Moreover, the terms "first" and "second" are used for descriptive purposes only and are not to be construed as indicating or implying a relative importance or implicitly indicating the number of technical features indicated. Thus, features defining "first" or "second" may include at least one of the features, either explicitly or implicitly. In the description of the present disclosure, the meaning of "a plurality" is at least two, such as two, three, etc., unless specifically defined otherwise.

Finally, it should be noted that the above embodiments are only used to illustrate the technical solutions of the present disclosure, and are not limited thereto; although the present disclosure has been described in detail with reference to the foregoing embodiments, those of ordinary skill in the art should understand that it can still modify the technical solutions described in the foregoing embodiments, or replace some of the technical features, and the modifications and substitutions do not drive the essence of the corresponding technical solutions from the spirit and scope of the technical solutions of the embodiments of the present disclosure.

What is claimed is:

1. A camera device, comprising:
   a bracket, wherein the bracket comprises a frame body and at least one fixing portion, the frame body defines a receiving space, and the at least one fixing portion is disposed on a side of the frame body facing away from the receiving space and configured to connect an external device;
   a camera unit, wherein at least part of the camera unit is accommodated in the receiving space;
   a trim member and a protector, the trim member is disposed and covered on the frame body and the camera unit, the protector is disposed on a side of the trim member facing away from the camera unit;
   a seal, and the seal is disposed between the frame body and the trim member; and
   wherein the frame body is a hollow frame body, the frame body is disposed around a periphery of the camera unit, an end surface of the frame body adjacent to a bottom of the camera unit protrudes more outward than the bottom of the camera unit, both the end surface of the frame body and the bottom of the camera unit are located on a bottom side of the camera unit, and the bottom side of the camera unit is the side opposite to a lens side of the camera unit; and
   wherein the receiving space is defined into a first receiving space and a second receiving space, the camera device comprises two cameras, the two cameras are respectively disposed in the first receiving space and the second receiving space.

2. The camera device as claimed in claim 1, wherein the seal is made of any one of silicone, rubber, and foam.

3. A mobile terminal, comprising:
   a display screen, a border, a rear housing, a mounting member, and a camera device, the display screen and the rear housing respectively disposed on two sides of the border, and the mounting member disposed between the display screen and the rear housing, the camera device comprising a bracket and a camera unit,
   wherein the bracket comprises a frame body and at least one fixing portion, the frame body defines a receiving space, at least part of the camera unit is accommodated in the receiving space, and the at least one fixing portion is disposed on a side of the frame body facing away from the receiving space and configured to connect an external device;
   a trim member and a protector, the trim member is disposed and covered on the frame body and the camera unit, the protector is disposed on a side of the trim member facing away from the camera unit;
   a seal, and the seal is disposed between the frame body and the trim member;

wherein the frame body is a hollow frame body, the frame body is disposed around a periphery of the camera unit, an end surface of the frame body adjacent to a bottom of the camera unit protrudes more outward than the bottom of the camera unit, both the end surface of the frame body and the bottom of the camera unit are located on a bottom side of the camera unit, and the bottom side of the camera unit is the side opposite to a lens side of the camera unit; and wherein the receiving space is defined into a first receiving space and a second receiving space, the camera device comprises two cameras, the two cameras are respectively disposed in the first receiving space and the second receiving space, and the camera device is connected to the mounting member by the at least one fixing portion.

4. The mobile terminal as claimed in claim 3, wherein the mounting member defines a mounting hole, and the mounting hole runs through the mounting member, at least part of the camera device is accommodated in the mounting hole, and a preset gap is defined between the camera unit and the display screen.

5. The mobile terminal as claimed in claim 3, wherein the mobile terminal further comprises at least one screw connection, and the mounting member defines at least one screw hole, each fixing portion defines a connecting hole, and each screw connection is disposed through one connecting hole and screwed with one screw hole.

6. The mobile terminal as claimed in claim 3, wherein the mounting member is provided with at least one connecting portion, and each fixing portion defines a connecting hole, each connecting portion is connected to one fixing portion correspondingly.

7. The mobile terminal as claimed in claim 3, wherein the mounting member is provided with at least one connecting portion, each fixing portion defines a connecting hole, each connecting portion protrudes into one connecting hole and connected to one fixing portion after hot melt correspondingly.

8. A mobile terminal, comprising:
a display screen;
a rear housing;
a mounting member, disposed between the display screen and the rear housing; and
a camera device, comprising a bracket and a camera unit, wherein the bracket comprises a frame body and at least one fixing portion, the frame body defines a receiving space, at least part of the camera unit is accommodated in the receiving space, and the at least one fixing portion is disposed on a side of the frame body facing away from the receiving space and configured to connect an external device, and the at least one fixing portion is connected to the mounting member thereby the camera device being supported by the mounting member,
wherein the camera device further comprises
a trim member and a protector, the trim member is disposed and covered on the frame body and the camera unit, the protector is disposed on a side of the trim member facing away from the camera unit;
a seal, and the seal is disposed between the frame body and the trim member;
wherein the frame body is a hollow frame body, the frame body is disposed around a periphery of the camera unit, an end surface of the frame body adjacent to a bottom of the camera unit protrudes more outward than the bottom of the camera unit, both the end surface of the frame body and the bottom of the camera unit are located on a bottom side of the camera unit, and the bottom side of the camera unit is the side opposite to a lens side of the camera unit; and
wherein the receiving space is defined into a first receiving space and a second receiving space, the camera device comprises two cameras, the two cameras are respectively disposed in the first receiving space and the second receiving space.

9. The mobile terminal as claimed in claim 8, wherein the frame body is a hollow frame body, the frame body is disposed around a periphery of the camera unit, and an end surface of the frame body adjacent to a bottom of the camera unit protrudes more outward than the bottom of the camera unit.

10. The mobile terminal as claimed in claim 8, wherein the frame body comprises a first side, a second side, a third side, and a fourth side, the first side, the second side, the third side, and the fourth side are connected end to end in sequence, and the first side, the second side, the third side, and the fourth side cooperatively define the receiving space.

11. The mobile terminal as claimed in claim 8, further comprising a reinforcing portion, the reinforcing portion disposed on a side of the frame body facing the receiving space, and the reinforcing portion protrudes from at least one inner surface of the frame body.

12. The mobile terminal as claimed in claim 8, further comprising a reinforcing partition, disposed in the frame body, wherein one end of the reinforcing partition is connected to the second side, and the other end is connected to the fourth side, and the reinforcing partition defines the receiving space into a first receiving space and a second receiving space.

13. The mobile terminal as claimed in claim 8, wherein the at least one fixing portion is disposed on at least one of the first side, the second side, the third side, and the fourth side, and the at least one fixing portion extends away from the receiving space.

14. The mobile terminal as claimed in claim 13, wherein the first side and the third side are disposed on opposite sides of the bracket, the at least one fixing portion comprises a first fixing portion and a second fixing portion, the first fixing portion is disposed on the first side, and the second fixing portion is disposed on the third side.

15. The mobile terminal as claimed in claim 8, wherein each fixing portion defines a connecting hole, and the connecting hole is configured to connect the external device.

16. The mobile terminal as claimed in claim 8, wherein each fixing portion is provided with a glue position, and the glue position is configured to connect the external device.

17. The mobile terminal as claimed in claim 8, wherein the bracket is made of any one of stainless steel, high alloy steel, and plastic.

* * * * *